(12) United States Patent
King et al.

(10) Patent No.: US 7,189,026 B2
(45) Date of Patent: Mar. 13, 2007

(54) PORTABLE BREAKWATER

(75) Inventors: Karen King, Denmark, ME (US); Lisa M. Burns, Denmark, ME (US)

(73) Assignee: Cabins to Castles, Inc., Denmark, ME (US)

( * ) Notice: Subject to any disclaimer, the term of this patent is extended or adjusted under 35 U.S.C. 154(b) by 269 days.

(21) Appl. No.: 11/098,855

(22) Filed: Apr. 5, 2005

(65) Prior Publication Data

US 2005/0191128 A1    Sep. 1, 2005

Related U.S. Application Data

(63) Continuation of application No. 09/888,013, filed on Jun. 22, 2001.

(60) Provisional application No. 60/214,214, filed on Jun. 23, 2000.

(51) Int. Cl.
*E02B 3/06*    (2006.01)

(52) U.S. Cl. .............................. 405/32; 405/21; 405/28

(58) Field of Classification Search .................. 405/15, 405/21, 24, 26, 28, 32, 115; 256/1, 12.5, 256/13
See application file for complete search history.

(56) References Cited

U.S. PATENT DOCUMENTS

| | | | |
|---|---|---|---|
| 3,357,192 A | 12/1967 | Hilbarger | |
| 3,791,150 A | 2/1974 | Tachii | |
| 4,738,563 A * | 4/1988 | Clark | 405/21 |
| 4,776,724 A | 10/1988 | Isozaki | |
| 5,269,254 A * | 12/1993 | Gagliano et al. | 405/32 |
| 5,294,211 A | 3/1994 | Niimura | |
| 5,304,005 A | 4/1994 | Loeffler-Lenz | |
| 5,688,075 A | 11/1997 | Gradek | |
| 5,720,573 A * | 2/1998 | Benedict et al. | 405/21 |
| 5,827,011 A | 10/1998 | Kann | |
| 6,149,135 A * | 11/2000 | Hlavin | 256/12.5 |

FOREIGN PATENT DOCUMENTS

| | | | | |
|---|---|---|---|---|
| GB | 2204080 | * | 11/1998 | |
| JP | 63122811 | * | 5/1988 | 405/21 |

* cited by examiner

*Primary Examiner*—Jong-Suk (James) Lee
(74) *Attorney, Agent, or Firm*—Pierce Atwood; Kevin M. Farrell; Ryan B. Kennedy

(57) ABSTRACT

A portable breakwater system for use in a body of water includes first and second support members adapted to be positioned on the floor of the body of water and a curtain attached between the first and second support members. The first and second support members allow the curtain to freely rise in response to a wave in the body of water so as to attenuate the wave. Each support member includes a base plate and a frame assembly extending upwardly from the base plate. The base plates can be anchored to the water floor with one or more weights. The frame assemblies include pivoting or telescoping sections that permit the curtain to rise in response to a wave. Alternatively, the curtain can be attached to pre-existing underwater structure, such as the support members of a dock located in the body of water. In this case, the curtain is attached to the support members via attachment sleeves that are slidingly mounted on the support members.

12 Claims, 10 Drawing Sheets

PORTABLE BREAKWATER

RELATED APPLICATIONS

The present application is a Continuation of U.S. application Ser. No. 09/888,013, filed on Jun. 22, 2001, which is a Non-Provisional of Provisional Application No. 60/214,214, filed on Jun. 23, 2000, the entire contents of which are incorporated by reference.

BACKGROUND OF THE INVENTION

1. Field of the Invention

The present invention relates to systems and devices for attenuating or dissipating wave energy. More particularly, the present invention relates to portable systems and devices deployable in a body of water between generated waves and a shoreline to be protected from wave impact.

2. Description of Related Art

Anyone living along a shoreline, whether at the ocean, along a river, or beside a lake or pond, is familiar with erosion. While some processes of erosion are subtler than others, waves produce the most apparent and rapid shoreline erosion. Underwater currents or external weather events may generate waves. In addition, human activities, such as boating, produce sporadic but particularly devastating erosive waves. The on going and apparently increasing interest in the use of watercraft, particularly in confined bodies of water, indicates that shoreline erosion problems will remain and may increase.

The owners of shoreline property have to date had little recourse to prevent the man-made waves and certainly no recourse in regard to naturally generated waves. As a result, periodic and costly repair of the shoreline is generally seen as the only way to respond to the impact of erosion. Of course, it is possible to introduce breakwater systems formed of boulders, rocks, timbers, concrete structures, and the like into the water. The breakwater is intended to do as its name suggests: break up the flow of the water, whether in the form of a wave or an undercurrent, as it approaches the shoreline. That is done on occasion and typically seen in oceanside locations. However, such structures are permanently set in a fixed position and they tend to disrupt the natural appearance of the shoreline. Moreover, they ordinarily fall under the purview of governmental authorities that place breakwaters for the intended common good of the general public, a particular group, or as part of a larger plan or project. Although private individuals may place fixed breakwaters in the vicinity of their shorelines, assuming they have the right to put such structures in the water, they can be quite expensive. In addition, they may not be able to block all incoming waves, dependent on changes in the direction of the waves. Moreover, they have a tendency to disrupt the natural appearance and/or usage of the shoreline. It is also to be noted that these structures are quite rigid and therefore deflect or transfer the wave energy from one location to another. That deflected energy may simply cause damage at another location.

Therefore, what is needed is a breakwater system or device that is suitable for dissipating or attenuating the energy associated with waves coming into a shoreline. Further, what is needed is such a breakwater system or device that is relatively inexpensive and simple to install in comparison to the introduction of existing fixed breakwater structures. Yet further, what is needed is a breakwater system that absorbs wave energy rather than simply deflecting it. Also, what is needed is a breakwater system that is relatively portable such that it may be moved to a plurality of sites as desired by the user. Moreover, what is needed is a breakwater system that minimizes the disruption to the appearance and/or use of the natural shoreline.

SUMMARY OF THE INVENTION

In view of the foregoing, it is an object of the present invention to provide a breakwater system and related method to dissipate or attenuate the energy associated with waves coming into a shoreline. It is also an object of the present invention to provide a breakwater system that is relatively inexpensive and easy to install in comparison to the introduction of existing fixed breakwater structures. It is a further object of the present invention to provide a portable breakwater system that may be deployed to a plurality of site as desired by the user. Yet further, it is an object of the present invention to provide a breakwater system that absorbs rather than deflects wave energy. Still further, it is an object of the present invention to provide a breakwater system that minimizes the disruption to the appearance and/or use of the natural shoreline.

These and other objects are achieved with the present invention, which in one embodiment is a portable breakwater system that is installed in the water in proximity to a shoreline region to be protected. The system includes a base plate that is designed to rest on the floor of the body of water where the wave action is to be dissipated. Although the system of the present invention may be used in any sort of water, it is particularly advantageous in lakes and ponds because these bodies of water tend to have less fluctuation of water levels and less extreme storm conditions than oceans. The base plate is part of a larger support subsystem that also includes sites to selectably locate thereon stabilizing units such as one or more anchors or weights. The stabilizing units and the base plate act to maintain the entire structure in position through expected water movement conditions. The support structure may be moved to one or more positions of interest and a plurality of support structures may be placed adjacent to one another.

The support system also includes frame mounts for receiving a frame. The frame in turn acts as the retainer mechanism for locating a dissipation screen or curtain in a variable position at, below, and above the water surface. The screen or curtain acts as a wave-dissipating device in that it is fabricated and formed to absorb, rather than deflect or transfer, energy. The frame is preferably configured to retain an upper portion of the curtain flat on a smooth water body surface. When wave action begins, the frame preferably enables movement of the upper portion of the curtain to a substantially completely upright position such that the wave energy, embodied in wave height, is diminished. The water associated with that wave action is allowed to pass around the curtain but with a substantial portion of its forward-projecting energy absorbed by the curtain rather than the shoreline.

The combination of the portable frame and the absorbing curtain create a wave dissipation system that may be set up where desired without great difficulty and relatively little expense. It is contemplated that the system will address the problems of soil and sediment erosion related to direct, oblique, or longshore waves, wakes, and/or water current action that flows in shallow and/or fluctuating water levels. These and other advantages of the invention will become apparent upon review of the following description and the drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
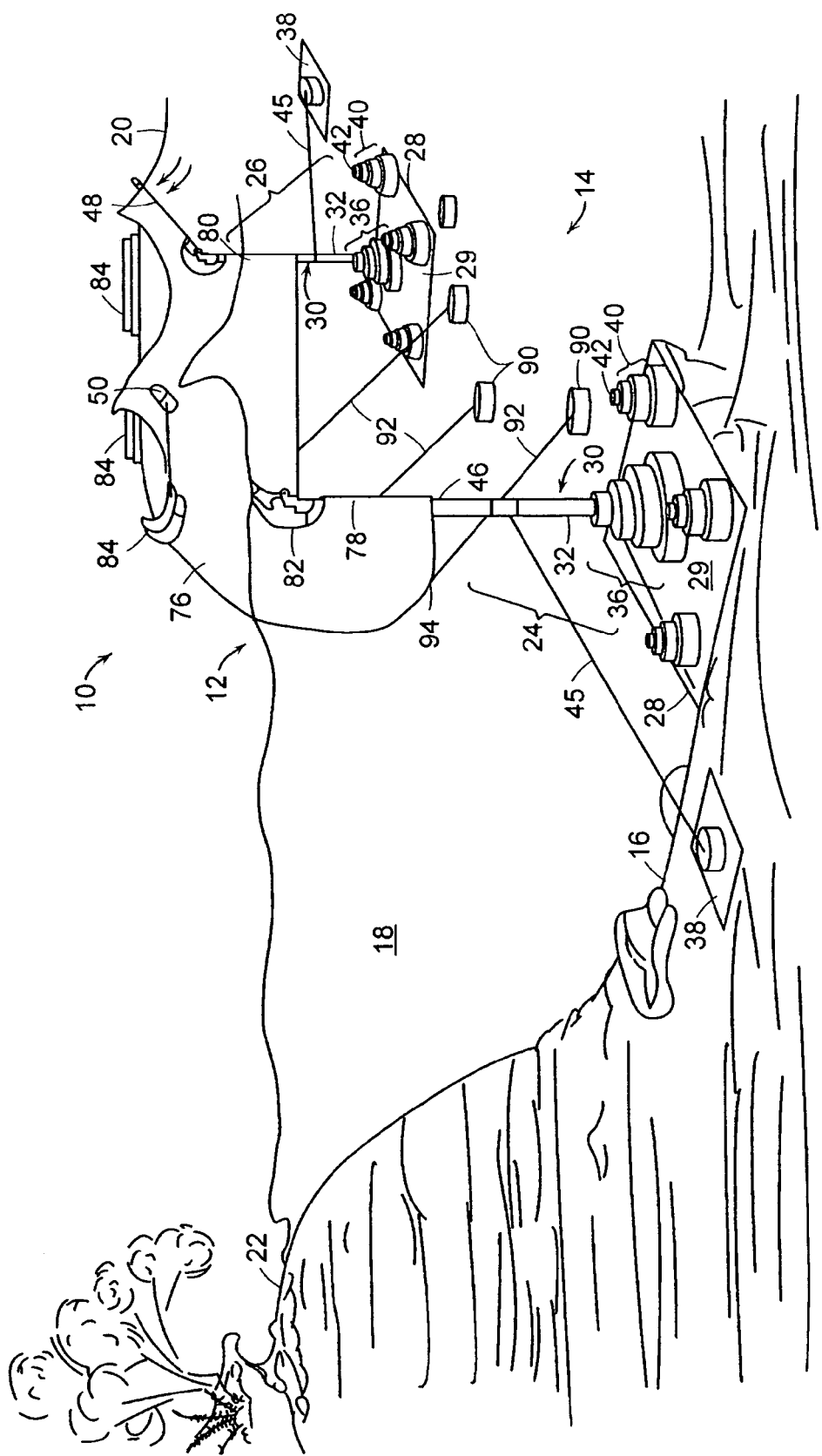
FIG. 1 is a perspective representation of the portable breakwater system of the present invention shown in context.

A portable breakwater system 10 of the present invention is shown in FIG. 1. The system 10 includes an attenuation or wave-impact curtain 12 and a curtain support assembly 14. The system 10 is positionable on a floor 16 of a body of water 18. It may be used to absorb the energy of one or more inbound waves 20 from impacting a shoreline 22 in order to minimize erosion of the shoreline 22.

Figure 2:
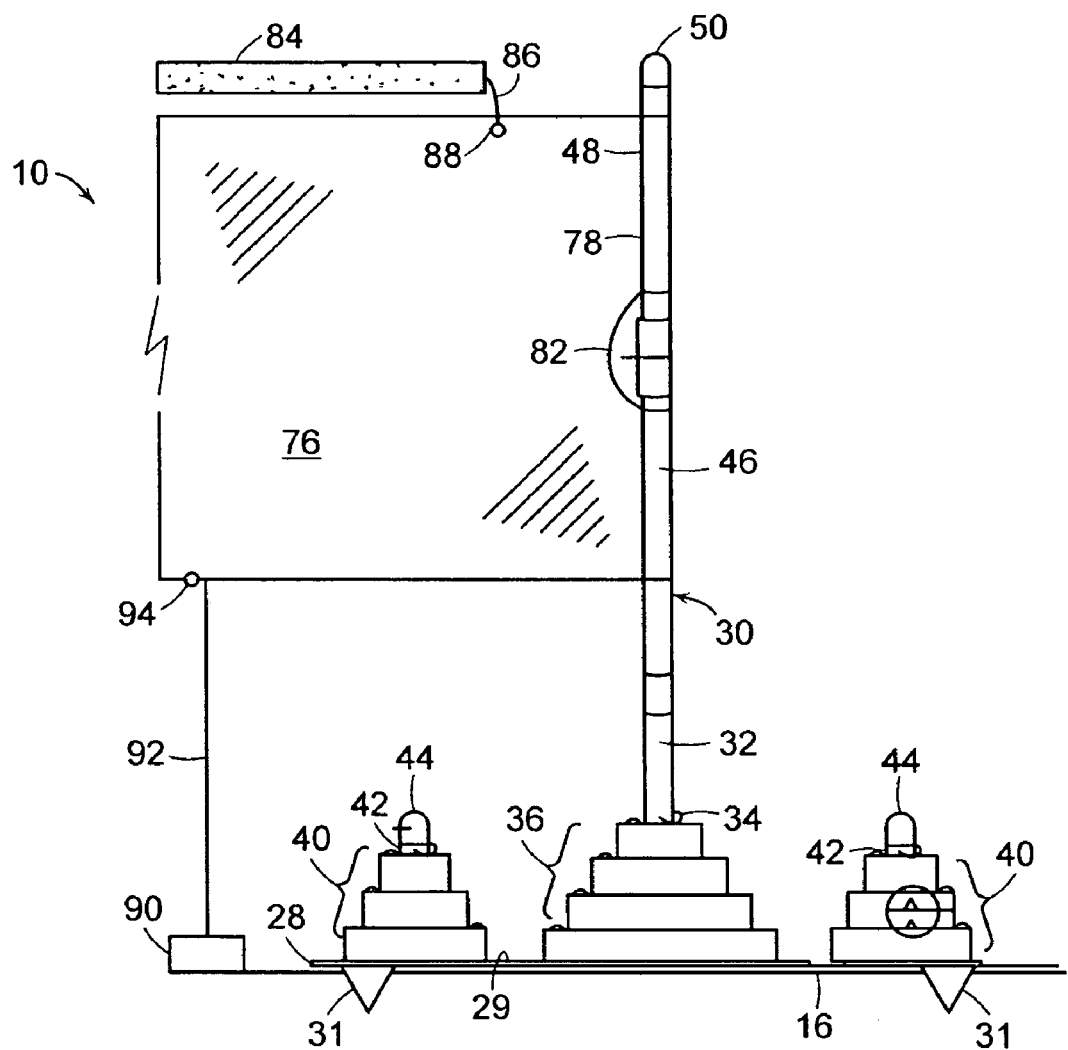
FIG. 2 is a front view of a portion of the portable breakwater system of the present invention.

With reference to FIGS. 1 and 2, the support assembly 14 includes a first support member 24 and a second support member 26 having the curtain 12 supported between them. Each of the first support member 24 and the second support member 26 includes a frame base plate 28 and a frame assembly 30 extending upwardly from the base plate 28. The frame base plates 28 preferably include one or more securing cleats 31 to stabilize the base plate 28 on the underlying floor 16, particularly when that surface is rough or uneven in some way. The base plates 28 may be fabricated of any suitable material of sufficient density and capable of surviving underwater conditions. Further, the base plate 28 may be formed with perforations in a surface thereof in order to allow underwater currents to pass therethrough with minimal interference.

Each of the base plates 28 further includes a central frame-receiving port and, optionally, one or more post-receiving ports positioned on an upper base surface 29. The central port may be threaded or otherwise configured to removably receive a first frame section 32 of the respective frame assemblies 30. That first frame section 32 may be fabricated of a non-metallic material or a metallic material and may be hollow or solid. It is designed to be detachably affixed to the base plate 28. Alternatively, the first frame section 32 can be fixedly attached to the base plate 28.

Each support member 24 and 26 further includes one or more weights 36 stacked thereon for the purpose of maintaining the respective base plates 28 in place and ensuring that the entire system 10 remains in place where positioned on the floor 16 during the variety of environmental conditions to be experienced. The weights 36 are preferably of a donut shape so that they may be mounted over the first frame section 32. A locking or hitch pin 34 is inserted through the first frame section 32 just above the uppermost weight 36 to prevent relative movement between the first frame section 32 and the stack of weights 36. Of course, the weights 36 may be formed in alternative shapes provided they serve the function of anchoring the system and its components in place where desired.

A first set of weights 36 substantially centered on the first frame section 32 defines the location of that portion of the first support member 24. A second set of weights 36 substantially centered on the other first frame section 32 defines the location of that portion of the second support member 26. Although shown as a stepped set of four weights in FIG. 2, the number and size of weights 36 used is selectable as a function of the size of the system 10 and the conditions experienced in the body of water 18. Perimeter base weights 40 preferably positioned on perimeter posts 42 provide additional weight to the respective support members 24,26 as desired and required. Protective post safety caps 44 may be used to reduce the impact of any contact with upper surfaces of the posts 42. The safety caps 44 may be made of rubberized or other suitable material and may be colored with some type of warning color.

Figure 3:
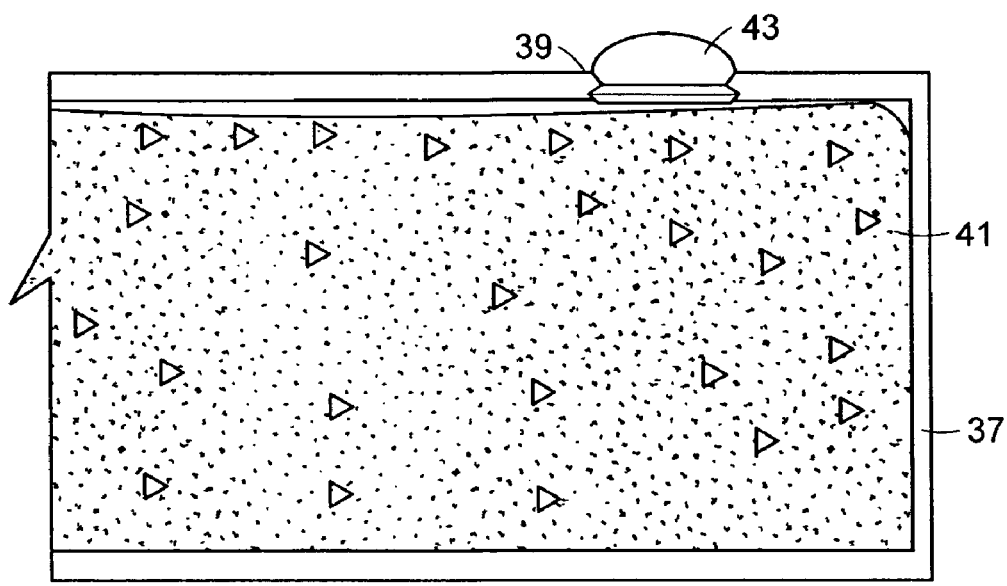
FIG. 3 is a cross-sectional view of a portion of a weight of the present invention.

As illustrated in FIG. 3, one embodiment of the weights 36 or 40 are preferably formed with a hollow casement body 37 having a fill port 39 for receiving a weight-providing material 41 that may be something substantially permanent, such as concrete. A casement cap 43 is threadingly engaged to the threaded fill port 39 to enclose the material 41 therein. Alternatively, the cap 43 may be removed to allow water to fill the casement body 37. The casement body 37 may be made of any suitable material, including plastic. As another alternative, the weights 36 or 40 could comprise a complementary pair of hollow, half donut shaped bodies filled with a weight-providing material and then snapped or otherwise joined together.

With continuing reference to FIGS. 1 and 2, each of frame assembly 30 further includes an intermediate frame section 46 detachably connected to the first frame section 32. The intermediate section 46 acts as the primary structural member for retaining the impact curtain 12 to be described herein. It is preferably threadingly engaged at a bottom end thereof to the top end of the first frame section 32. The intermediate frame section 46 may be of any selectable length dependent upon the depth of the body of water 18 where it is positioned on the floor 16. It may be formed of a material similar to that used for the first frame section 32. The first frame section 32 and the intermediate frame section 46 jointly define a bottom frame section. Alternatively, the first and intermediate frame sections could comprise a single, integral member defining the bottom frame section.

Each support member 24,26 may also include one or more supplemental base plates 38 disposed on the floor 16 of the body of water 18, at a location remote from the primary base plate 28. The supplemental base plates 38 are preferably anchored to the floor 16 by one or more weights in the same manner as the primary base plates 28. A wire, cable or rod 45 extends from each supplemental base plate 38 to the corresponding first or intermediate frame section 32,46 to further secure the support member 24,26.

Figure 4:
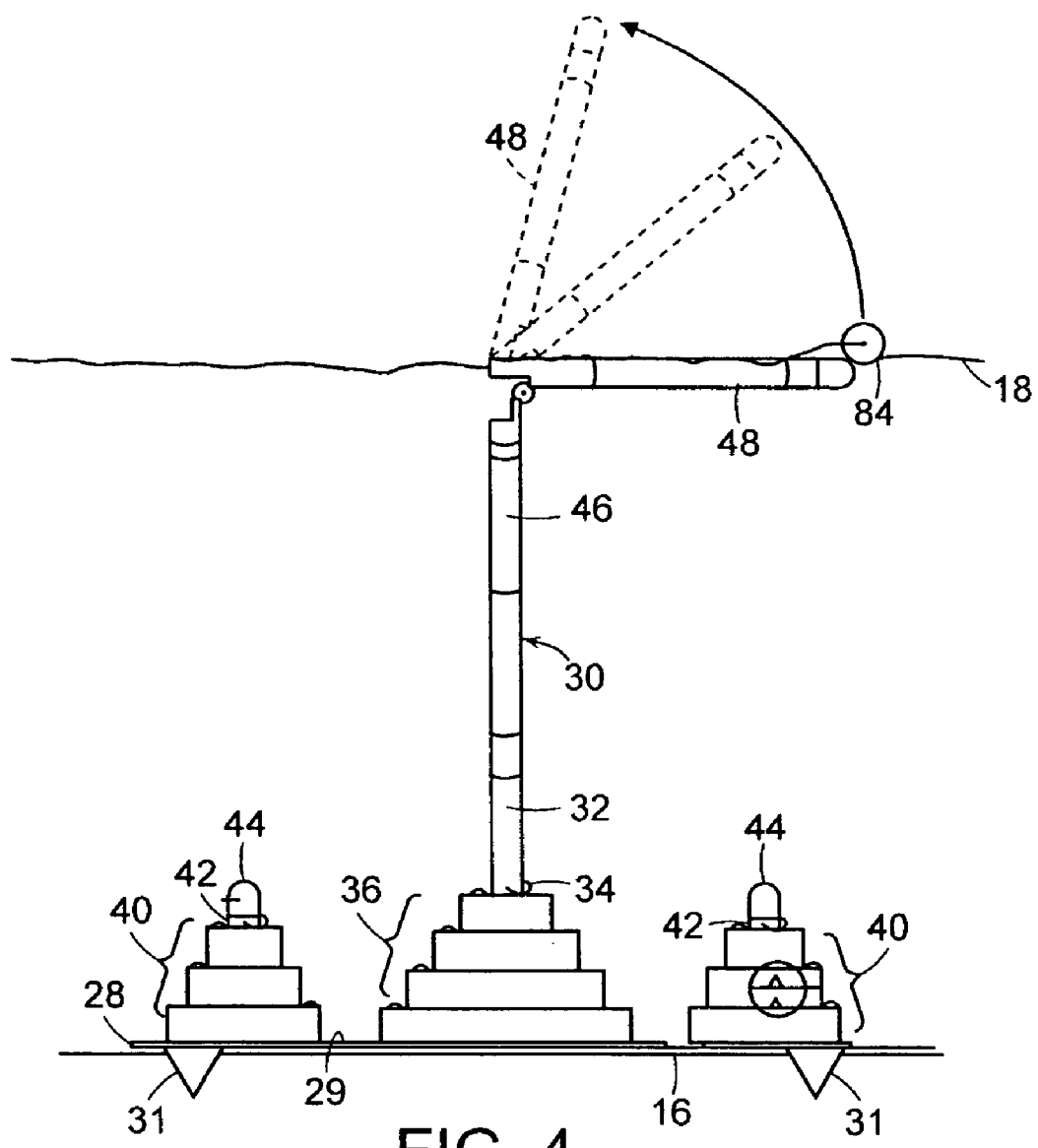
FIG. 4 is a side view of a portion of the portable breakwater system of the present invention.

The remaining portion of each of the respective support members 24,26 is a top frame section 48, preferably formed of the same material used to make sections 32 and 46. The top frame section 48 is preferably capped with a protective safety cap 50 much like the post safety cap 44. A useful aspect of the present invention is the coupling of the top frame section 48 to the intermediate frame section 46. In order to ensure that the system 10 performs its desired function when waves 20 exist while keeping the curtain 12 substantially out of sight when the water 18 is calm, the top frame section 48 is hinged to the intermediate frame section 46. As best seen in FIG. 4, this configuration permits pivoting of the top frame section 48 so that that portion of the two members 24,26 lays over the water 18 during calm conditions (shown in solid lines in FIG. 4) and freely rises when forced by wave or wake action (shown in dashed lines in FIG. 4).

Figure 5:
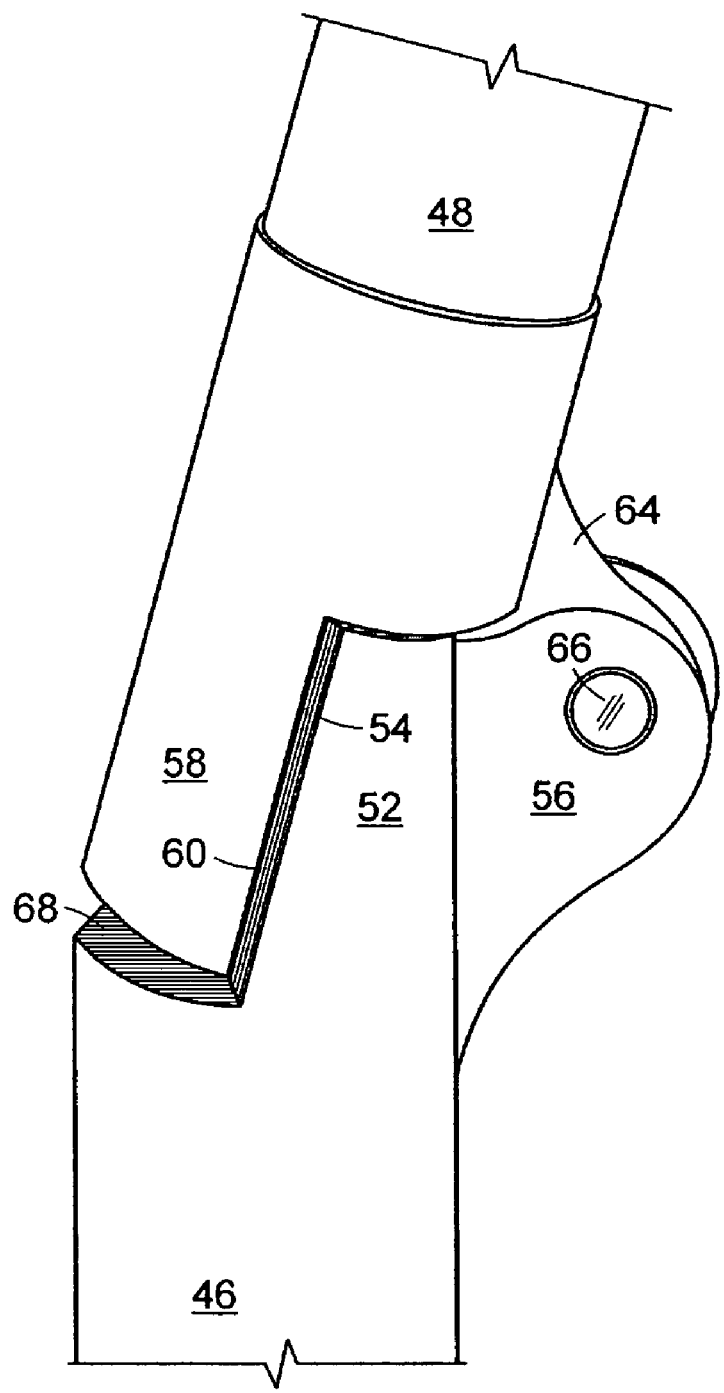
FIG. 5 is a side view of an offset hinge used in a support member of the present invention.

Referring to FIG. 5, an upper region 52 of each of the intermediate frame sections 46 is formed with an angled recess 54 and includes a paired eyelet flange 56. Relatedly, a lower region 58 of top frame section 48 includes a mirror image angled recess 60 that matches in an opposing manner the angled recess 54 of region 52. The lower region 58 also includes a ported hinge flange 64 designed to fit within the space between the paired eyelets of flange 56 in a pivoting manner. A removable hinge pin 66 may keep the two frame sections 46,48 detachably connected together. Moreover, the hinge pin 66 allows the top frame section 48 to pivotally move with respect to the intermediate frame section 46, which remains in a fixed position due to its coupling to the first frame section 32. It can be seen in FIG. 5 that the angled recesses 54 and 60 of the respective frame sections do not extend completely. Instead, they are truncated such that upper region 52 includes a truncation face 68 upon which lower region 58 bottoms out when the top frame section 48 is in its most upright position. This configuration prevents the curtain 12 from falling back towards the shore under the load of the waves 20 and become unable to provide wave attenuation capability. This function could alternatively be accomplished with a chain, cable or the like connected between the two frame sections 46,48. While a variety of angles of the angled recesses 54,60, may be contemplated, it has been observed that an angle of about 20° is suitable.

Figure 6:
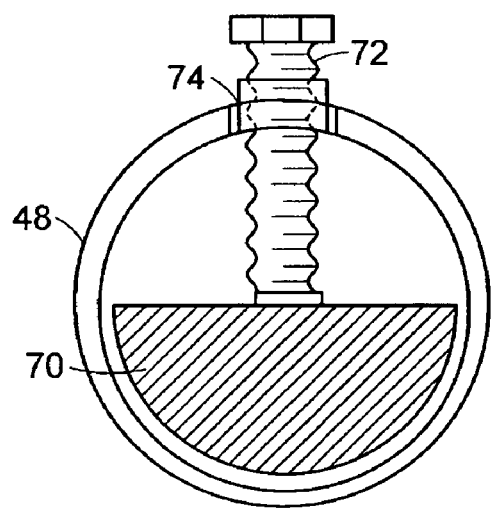
FIG. 6 is a cross-sectional detailed view of the weighting mechanism for the optional frame top return of the present invention.

As seen in FIG. 4, the top frame section 48 does not become completely vertical in its most upright position with this hinge configuration. This arrangement facilitates returning the curtain 12 to the lower position after the wave 20 passes. Although it is anticipated that the weight of the curtain 12 may be sufficient to ensure that when the frame connecting configuration of FIG. 5 is employed the curtain 12 will lay over during calm water conditions, the top frame 48 may be modified to accomplish that. Specifically as shown in FIG. 6, when a hollow material is employed to form the top frame section 48, a frame return weight 70 may be deployed therein, preferably above the frame section's center of mass. A tension bolt 72 may be threadingly employed within a frame port 74 to maintain the return weight 70 in position within the frame section 48.

Returning to FIGS. 1 and 2, the attenuation or impact curtain 12 includes a primary impact zone 76, a first frame attachment section 78 and a second frame attachment section 80. The attachment frame sections 78,80 are preferably looped regions extending the entire height of the curtain 12 and are configured to be placed around the frame sections 48,46. When so deployed, the support members 24,26 position the curtain 12 at its opposing ends in a substantially vertical orientation.

The curtain 12 may be fabricated of a substantially non-metallic material having energy absorbing qualities, such as neoprene. The looped sections may be made by permanently threading the curtain material onto itself or employing some type of releasable attachment mechanism, such as a hook-and-loop attachment. When the frame return hinge arrangement of FIG. 5 is employed, the curtain 12 preferably includes frame ports 82 to allow the top frame section 48 to move with minimal stretching of the curtain 12.

The curtain 12 may also include one or more flotation devices 84 deployed along its upper surface to keep the curtain open as shown with minimal sagging. The flotation devices 84 may be foam materials coupled along the upper edge of the curtain 12 by rope or string 86 through grommeted eyelets 88 incorporated into the curtain 12. Alternatively, the flotation devices 84 could be retained inside of sleeves formed along the upper edge of the curtain 12. The curtain 12 may further be fixed in position using underwater curtain weights 90 periodically spaced on the floor 16. As with the flotation devices 84, the curtain weights 90 may be coupled to the lower edge of the curtain 12 by weight rope or string 92 connected to curtain weight grommeted eyelets 94. It is to be noted that the curtain 12 may include periodic perforations therein to allow a portion of the water 18 and waves 20 to pass therethrough.

Figure 7:
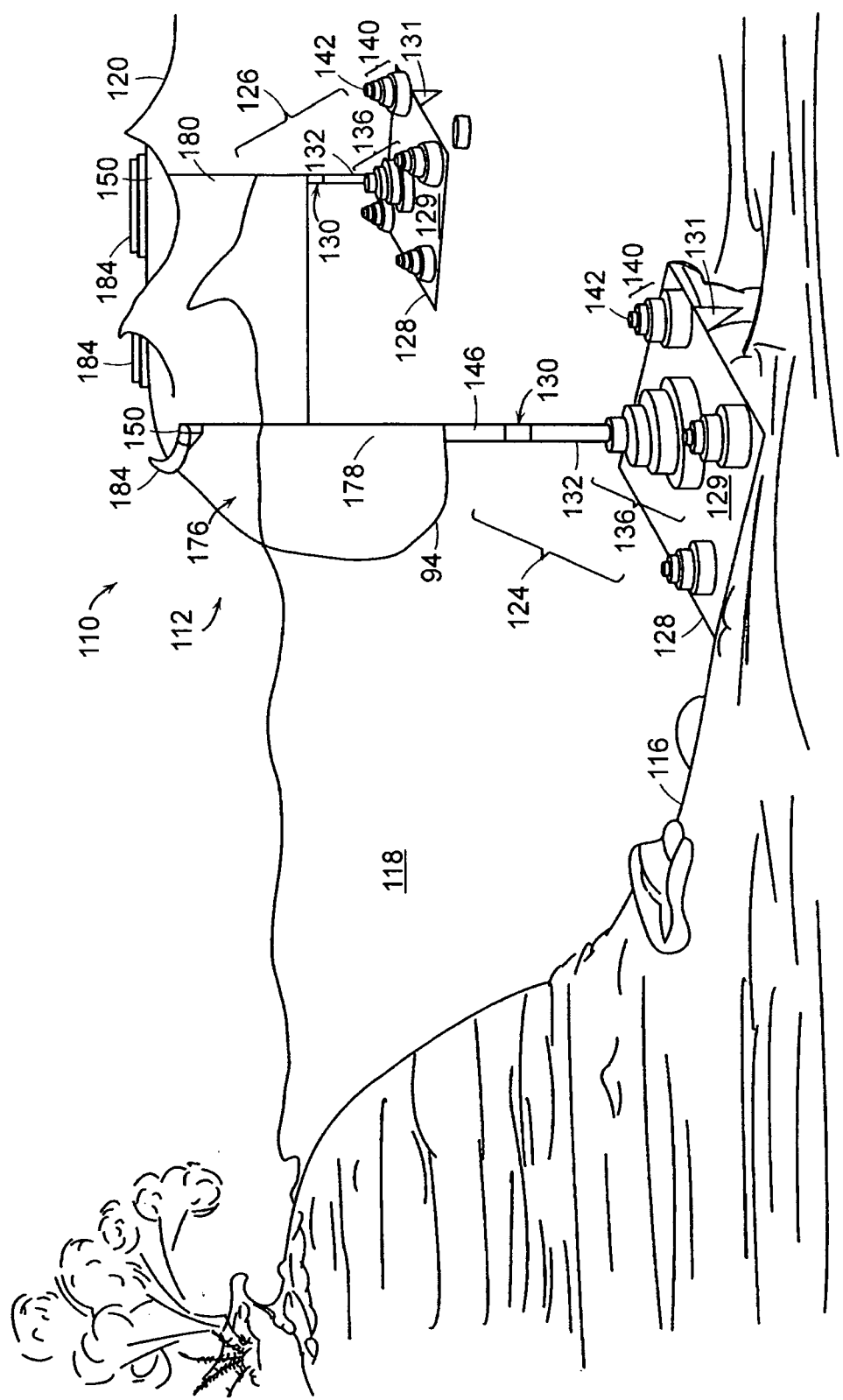
FIG. 7 is a perspective representation of a second embodiment of a portable breakwater system.
Figure 8:
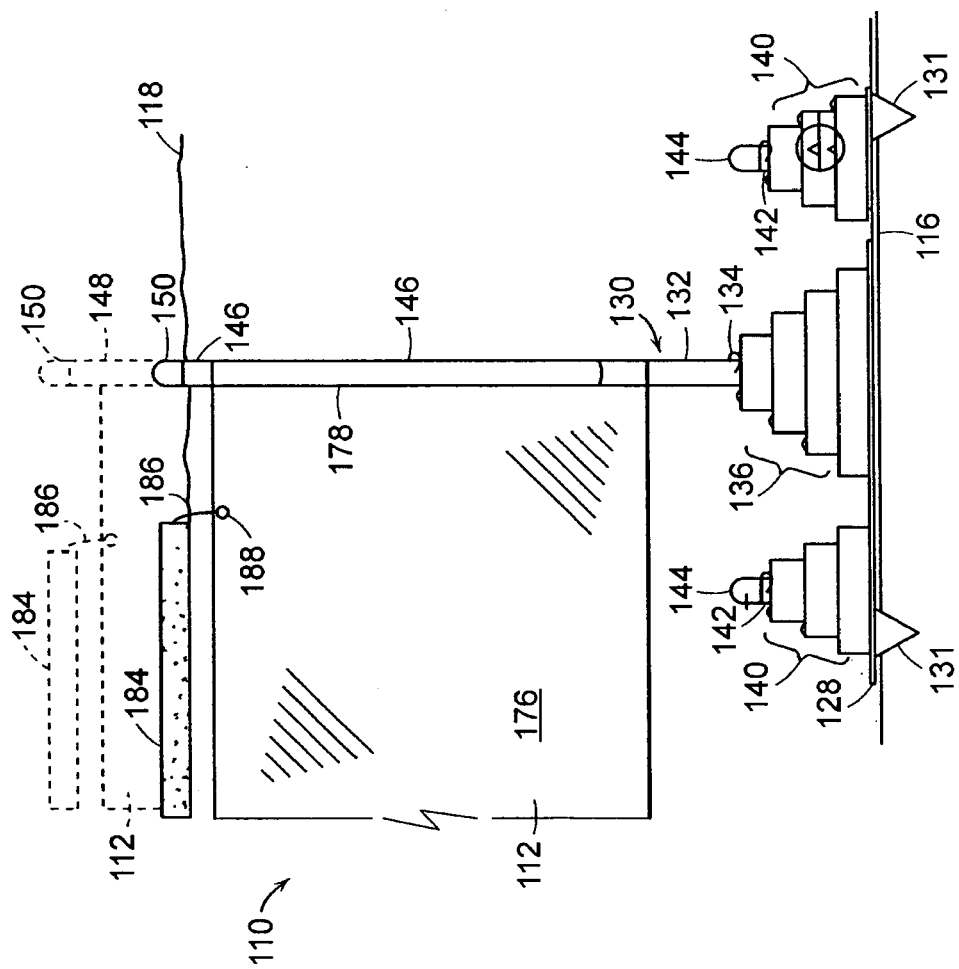
FIG. 8 is a front view of a portion of the portable breakwater system of FIG. 7.

Turning now to FIGS. 7 and 8, a second embodiment of a portable breakwater system 110 is shown. Like the first embodiment, the breakwater system 110 includes an attenuation or wave-impact curtain 112 supported between a first support member 124 and a second support member 126 disposed on the floor 116 of a body of water 118. The first support member 124 and the second support member 126 both include a primary base plate 128 and a frame assembly 130 extending upwardly from the base plate 128. The frame base plates 128 preferably include one or more securing cleats 131 to stabilize the base plate 128 on the underlying floor 116, particularly when that surface is rough or uneven in some way. The base plates 128 may be fabricated of any suitable material of sufficient density and capable of surviving underwater conditions. Further, the base plate 128 may be formed with perforations in a surface thereof in order to allow underwater currents to pass therethrough with minimal interference.

Each frame assembly 130 includes a bottom frame section 132 extending upwardly from the base plate 128. The bottom frame section 132 may be fabricated of a non-metallic material or a metallic material and may be hollow or solid. It is designed to be detachably affixed to the base plate 128.

Each support member 124,126 further includes one or more weights 136 stacked thereon for the purpose of maintaining the respective base plates 128 in place and ensuring that the entire system 110 remains in place where positioned on the floor 116 during the variety of environmental conditions to be experienced. The weights 136 are preferably of a donut shape so that they may be fixed in position about the bottom frame section 132. A locking or hitch pin 134 is inserted through the first frame section 132 just above the uppermost weight 136 to prevent relative movement between the bottom frame section 132 and the stack of weights 136. The weights 136 may be formed in alternative shapes provided they serve the function of anchoring the system and its components in place where desired.

Perimeter base weights 140 are preferably positioned on perimeter posts 142 to provide additional weight to the respective support members 124,126 as desired and required. Protective post safety caps 144 may be used to reduce the impact of any contact with upper surfaces of the posts 142. The safety caps 144 may be made of rubberized or other suitable material and may be colored with some type of warning color. The weights 136,140 are similar to those in the first embodiment. Although not shown in FIG. 7, supplemental base plates like those described above can also be employed.

Figure 9:
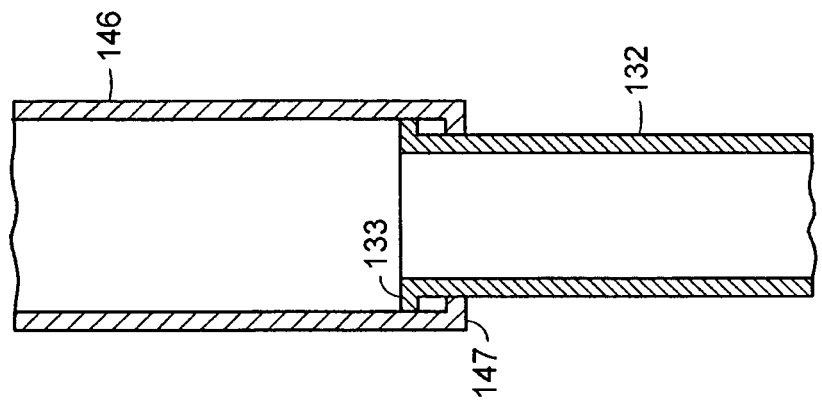
FIG. 9 is a cross-sectional detailed view of a telescoping post arrangement for the portable breakwater system of FIG. 7.

Each frame assembly 130 further includes a top frame section 146 disposed over the bottom frame section 132 in a telescoping manner. That is, the top frame section 146 is a hollow member that slides longitudinally over the bottom frame section 132. Referring to FIG. 9, the top frame section 146 has an internal lip 147 formed on its lower end, and the bottom frame section 132 has an external lip 133 formed on its upper end. The two lips 133,147 cooperate to prevent the top frame section 146 from sliding off the bottom frame section 132. The top frame section 146 is preferably capped with a protective safety cap 150 much like the post safety caps 144.

The attenuation or impact curtain 112 includes a primary impact zone 176, a first attachment section 178 and a second attachment section 180. The attachment sections 178,180 are preferably looped regions extending the entire height of the curtain 112 and are configured to be placed around the top frame sections 146 of the respective support members 124,126. The support members 124,126 thus position the curtain 112 at its opposing ends in a substantially vertical orientation. The curtain 112 is attached entirely to the top frame sections 146 so as to rise and fall with the top frame sections 146 relative to the bottom frame sections 132.

The curtain 112 may be fabricated of a substantially non-metallic material having energy absorbing qualities, such as neoprene. The attachment sections 178,180 may be made by permanently threading the curtain material onto itself or employing some type of releasable attachment mechanism, such as a hook-and-loop attachment. The curtain 112 may also include one or more flotation devices 184. The flotation devices 184 may be foam materials coupled along the upper edge of the curtain 112 by rope or string 186 through grommeted eyelets 188 incorporated into the curtain 112. Alternatively, the flotation devices 184 could be retained inside of sleeves formed along the upper edge of the curtain 112. It is to be noted that the curtain 112 may include periodic perforations therein to allow a portion of the water 118 and waves 120 to pass therethrough.

In operation, the flotation devices 184 hold the upper edge of the curtain 112 at the level of the water 118 with minimal sagging. During calm conditions, this means that the top frame sections 146 and curtain 112 are relatively low with respect to the bottom frame sections 132 (as depicted in solid lines in FIG. 8). When a wave 120 approaches, the flotation devices 184 rise with the wave pulling the curtain 112 upward as well. The telescoping top frame sections 146 slide upwardly with respect to the bottom frame sections 132, allowing the curtain 112 to freely rise so as to be in position to attenuate the wave 120 (as depicted in dashed lines in FIG. 8). Because the entire curtain 112 rises and falls with the top frame sections 146, the curtain weights 90 that are employed in the first embodiment are not used in the second embodiment.

Figure 10:
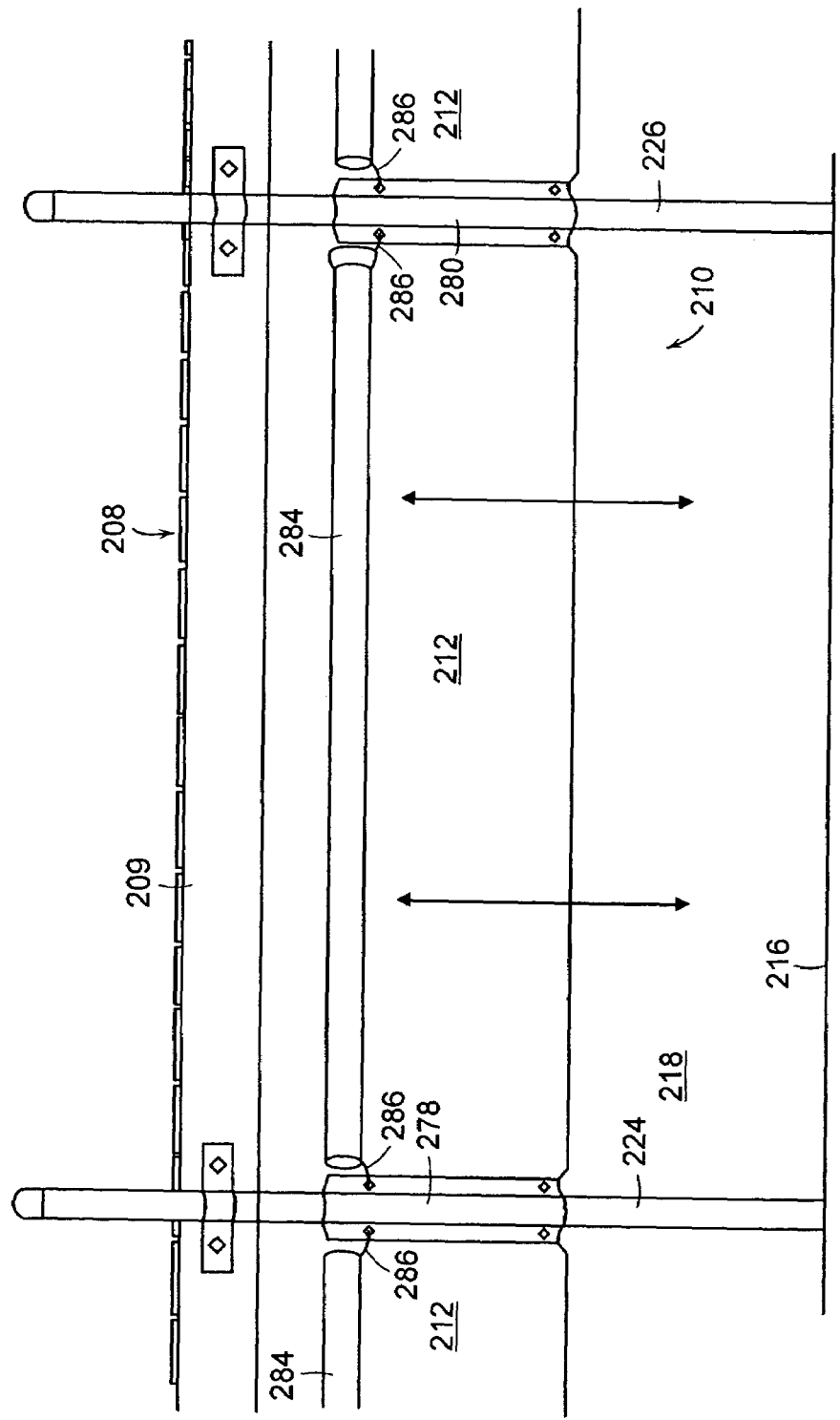
FIG. 10 is a front view of a third embodiment of a portable breakwater system.

Referring to FIG. 10, a third embodiment of a portable breakwater system 210 is shown. The breakwater system 210 of this embodiment includes at least one attenuation or wave-impact curtain 212 that is supported on pre-existing underwater structure located in a body of water 218. In the example illustrated in FIG. 10, the pre-existing underwater structure is a dock 208. Preferably, the dock 208 can be an L-shaped structure that includes a first section (not shown) that extends outward from the shore of the body of water 218, and a second section 209 that extends perpendicularly from the distal end of the first section. As such, the second section 209 is oriented substantially parallel to the shore. It should be noted that the curtain 212 is not limited to use with L-shaped dock structures, but can be used with a wide variety of underwater structures.

The dock 208 includes a plurality of underwater support members, such as poles or posts, that extend upward from the floor 216 of the body of water 218 to support the above-water portion of the dock 208. First and second ones 224, 226 of such support members are shown in FIG. 10 for supporting the second dock section 209. The first and second support members 224, 226 may be made of any material suitable for prolonged exposure to water.

In one possible configuration of this third embodiment, an attenuation curtain 212 is supported between the first and second support members 224, 226. This is accomplished using a first attachment sleeve 278 attached to a first end of the curtain 212 and a second attachment sleeve 280 attached to the opposite end of the curtain 212. The first attachment sleeve 278 is slidingly mounted on the first support member 224 below the above-water portion of the dock 208, and the second attachment sleeve 280 is slidingly mounted on the second support member 226 below the above-water portion of the dock 208. With this arrangement, the curtain 212 freely rises and falls in response to wave or wake action.

Figure 11:
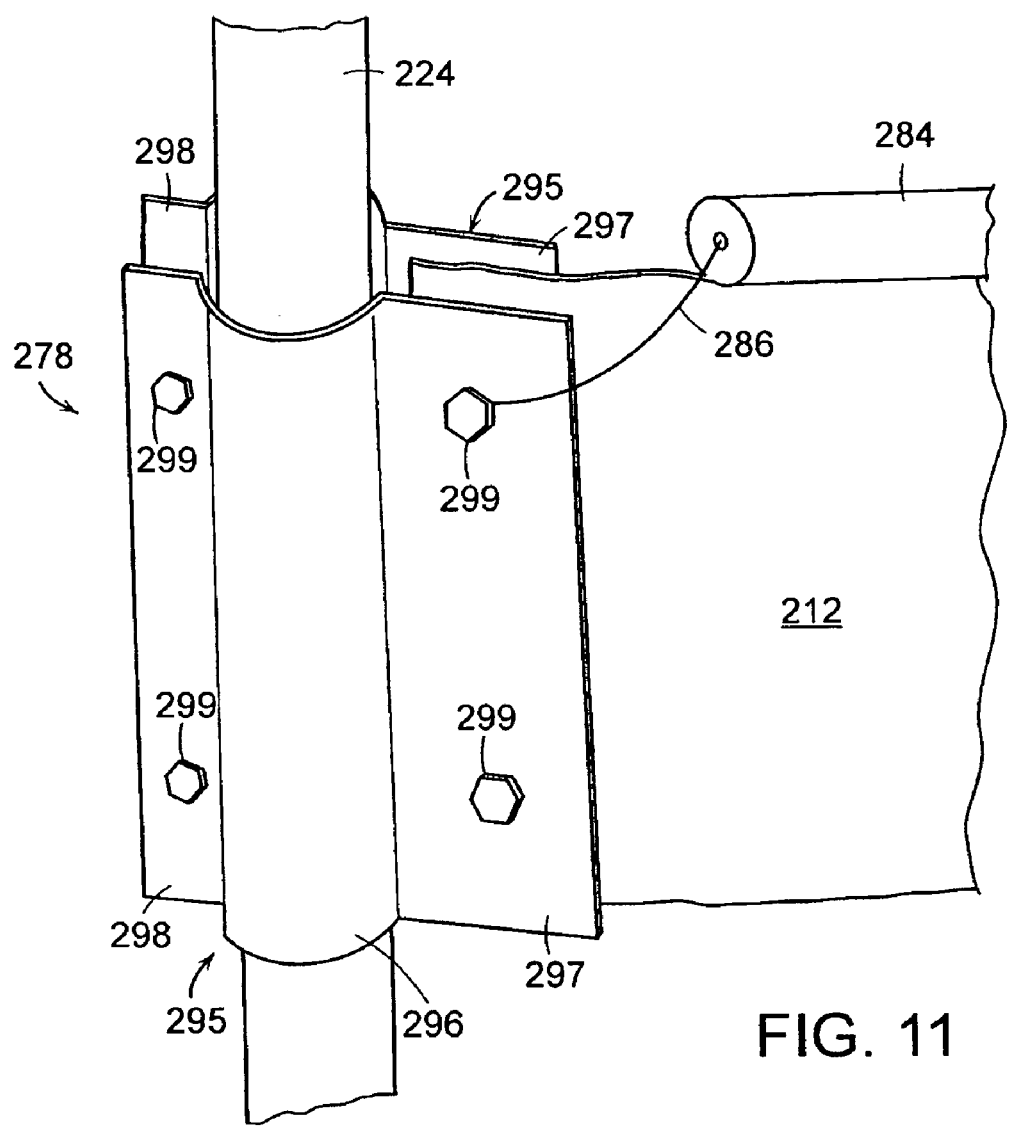
FIG. 11 is an enlarged, detailed view of a portion of the portable breakwater system of FIG. 10, showing a curtain attachment sleeve.
Figure 12:
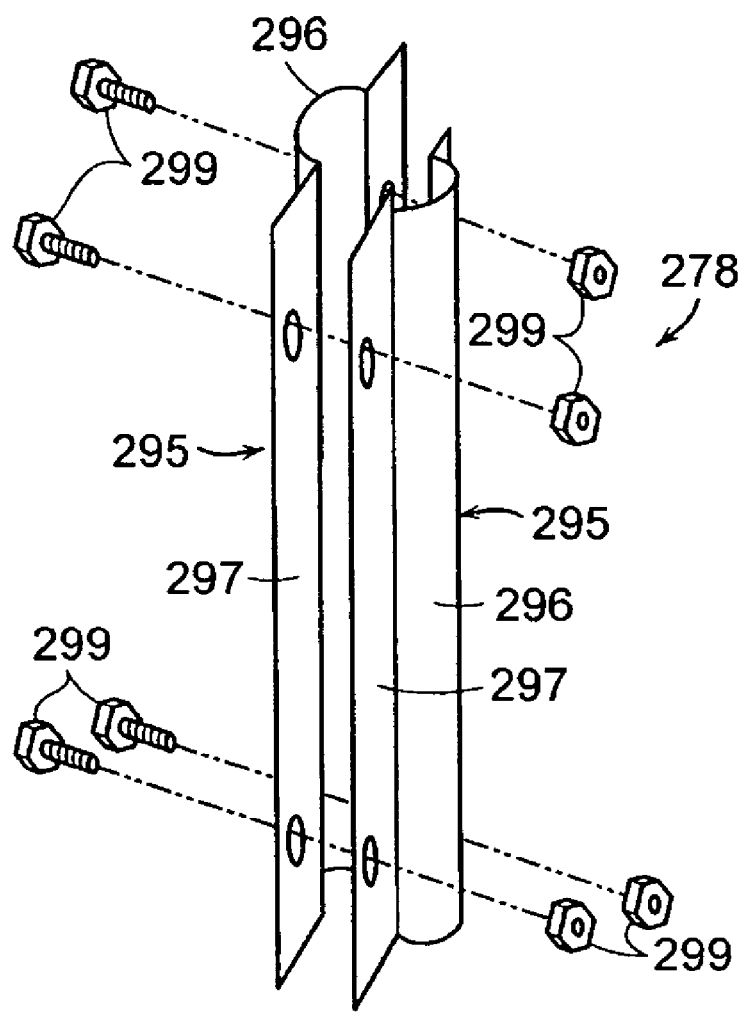
FIG. 12 is an exploded view of the attachment sleeve of FIG. 11.

As shown in FIGS. 11 and 12, the first attachment sleeve 278 includes a pair of brackets 295 arranged on opposite sides of the first support member 224 and the curtain 212. Specifically, each bracket 295 has a central indented section 296 and first and second planar flanges 297, 298 formed on respective sides thereof. The brackets 295 are arranged so that the two indented sections 296 enclose the first support member 224, with the curtain 212 being sandwiched between the two first flanges 297. The corresponding first flanges 297 are connected by any suitable fasteners such as nuts-and-bolts 299, and the corresponding second flanges 298 are similarly connected by suitable fasteners 299. Thus, the two brackets 295 are connected together so as to attach the sleeve 278 to the curtain 212 and allow the sleeve 278 and curtain 212 to slide relative to the first support member 224. It should be understood that the indented sections 296 are not limited to the semi-circular configuration shown in FIGS. 11 and 12 and can have other recessed configurations including non-circular curvatures, rectangular recesses, and the like. The second attachment sleeve 280 is substantially the same as the first and is therefore not described in detail here.

The curtain 212 may also include one or more flotation devices 284. The flotation devices 284 may be foam materials coupled along the upper edge of the curtain 212 by rope or string 286 attached to the attachment sleeves 278, 280. Alternatively, the rope or string 286 can be attached to the curtain 212 via grommeted eyelets incorporated therein. As another alternative, the flotation devices 284 could be retained inside of sleeves formed along the upper edge of the curtain 212. It is to be noted that the curtain 212 may include periodic perforations therein to allow a portion of the water 218 and waves to pass therethrough.

In operation, the flotation devices 284 hold the upper edge of the curtain 212 at the level of the water 218 with minimal sagging. During calm conditions, this means that the attachment sleeves 278, 280 and curtain 212 are relatively low with respect to the first and second support members 224, 226. When a wave approaches, the flotation devices 284 rise with the wave pulling the curtain 212 upward as well. The attachment sleeves 278, 280 slide upwardly on the respective support members 224, 226, allowing the curtain 212 to freely rise so as to be in position to attenuate the wave. Because the entire curtain 212 rises and falls with the attachment sleeves 278, 280, the curtain weights 90 that are employed in the first embodiment are not used in the third embodiment.

Referring again to FIG. 10, it is noted that additional curtains 212 can be attached to the dock 208 between adjacent pairs of support members. In this case, a single attachment sleeve could be used to attach adjacent ends of two curtains to the same support member. As with the prior embodiments, each curtain 212 may be fabricated of a substantially non-metallic material having energy absorbing qualities, such as neoprene.

While specific embodiments of the present invention have been described, it will be apparent to those skilled in the art that various modifications thereto can be made without departing from the spirit and scope of the invention as defined in the appended claims.

We claim:

1. A breakwater system for use in a body of water having a floor, the breakwater system comprising:
   a frame assembly comprising first and second support members constructed of generally rigid elements adapted to be positioned on the floor of the body of water, the first support member defining a first bottom frame section and a first top frame section and the second support member including a second bottom frame section and a second top frame section;
   a first hinge pivotably connecting the first top frame section to the first bottom frame section of the first support member such that the first top frame section is pivotable between a first position substantially laying on top of the body of water and a second position, wherein the second position is substantially vertical; and
   a curtain attached between the first and second support members, the curtain being disposed at least partially within the vertical extent of the support members such that the curtain freely rises in response to a wave in the body of water and freely falls after a wave passes.

2. The breakwater system of claim 1 further comprising a second hinge connecting the second top frame section to the second bottom frame section of the second support member such that the second top frame section is pivotable between a first position substantially laying on top of the body of water and a second position, wherein the second position is substantially vertical.

3. The breakwater system of claim 1 wherein the first and second support members both include a first base plate and a frame assembly extending upwardly from the first base plate.

4. The breakwater system of claim 3 wherein the first and second support members both further include one or more weights mounted on the first base plate.

5. The breakwater system of claim 4 wherein the one or more weights are disposed about the first bottom frame section of the first support member and the second bottom frame section of the second support member.

6. The breakwater system of claim 5 further comprising a second base plate remote from the first base plate and a connector element extending between the second base plate and the frame assembly.

7. The breakwater system of claim 1 wherein the curtain is fabricated from a material having energy absorbing qualities.

8. The breakwater system of claim 7 wherein the material is neoprene.

9. The breakwater system of claim 1 further comprising at least one flotation device attached to the curtain.

10. The breakwater system of claim 9 wherein the flotation device is attached along an upper edge of the curtain.

11. The breakwater system of claim 1 wherein the first top frame section is hollow.

12. The breakwater system of claim 11 further comprising a frame return weight disposed within the first top frame section.

* * * * *